No. 610,523. Patented Sept. 13, 1898.
F. W. CHADWICK.
VEHICLE BRAKE.
(Application filed Feb. 21, 1898.)
(No Model.)
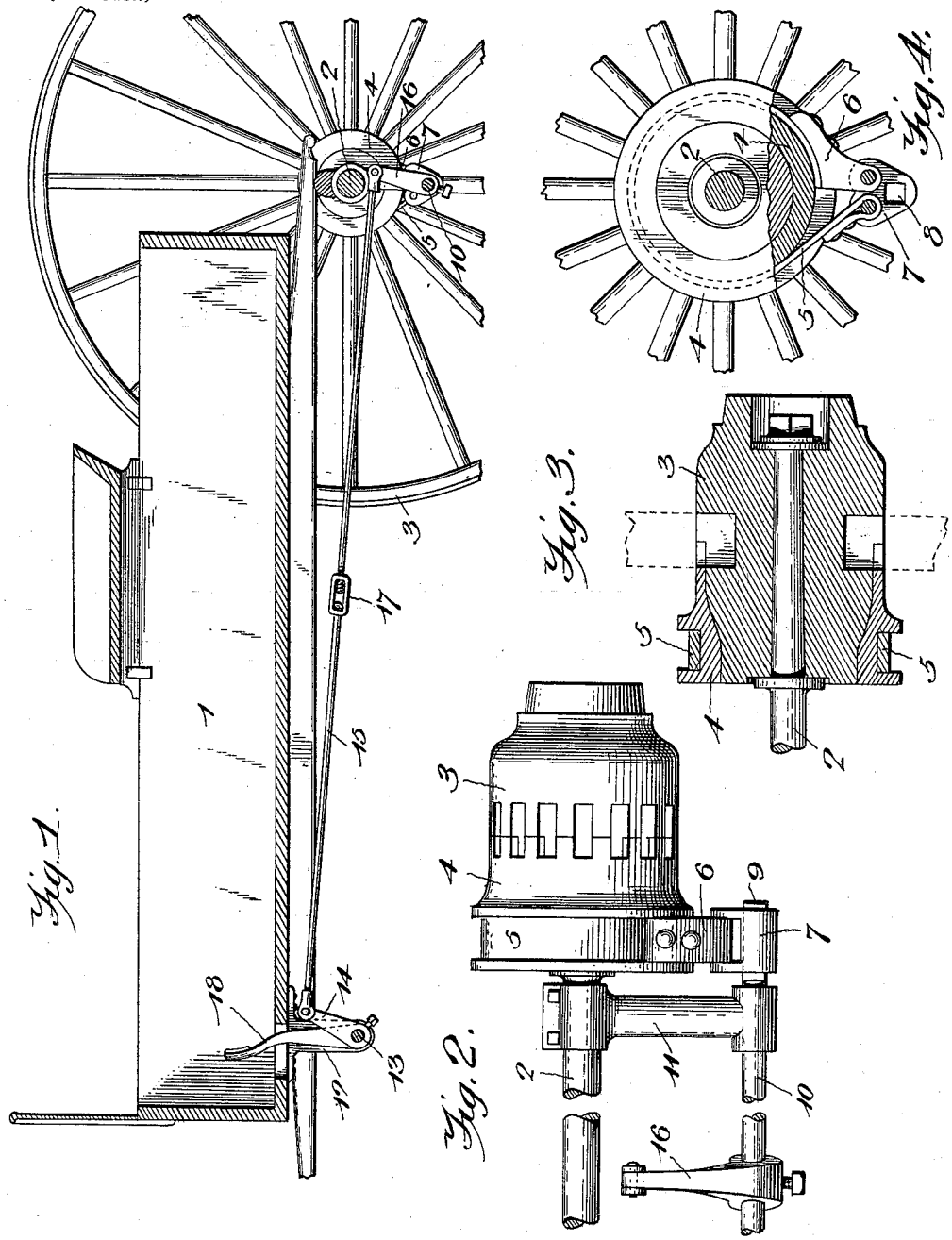
Witnesses
J. Frauf Culverwell,
U. B. Hillyard.
Frank W. Chadwick, Inventor.
By his Attorneys,
C. A. Snow & Co.

UNITED STATES PATENT OFFICE.

FRANK W. CHADWICK, OF QUINCY, ILLINOIS.

VEHICLE-BRAKE.

SPECIFICATION forming part of Letters Patent No. 610,523, dated September 13, 1898.

Application filed February 21, 1898. Serial No. 671,168. (No model.)

*To all whom it may concern:*

Be it known that I, FRANK W. CHADWICK, a citizen of the United States, residing at Quincy, in the county of Adams and State of Illinois, have invented a new and useful Vehicle-Brake, of which the following is a specification.

This invention pertains to brakes chiefly designed for use in connection with wagons and road-vehicles generally and is intended to devise a brake mechanism of the variety embodying a brake-strap to act jointly with the hub of a vehicle-wheel which will be of simple arrangement, effective in operation, and enable the brake to be instantly applied when required to check the momentum of the vehicle to which the brake is fitted.

Various other objects and advantages are sought to be attained and will appear and suggest themselves as the details of the invention are comprehended, and for this purpose reference is to be had to the accompanying drawings and the subjoined description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a view in elevation of the brake mechanism, showing the relative disposition of the parts when applied to a vehicle, so much of the latter being illustrated as will give a clear idea of the disposition of the parts when in working position. Fig. 2 is a detail view as seen from the rear. Fig. 3 is a longitudinal section of the hub portion of the vehicle-wheel having the brake-band fitted thereto.
Fig. 4 is a detail view of the inner end of the hub, showing the brake members in operative relation.

Corresponding and like parts are referred to in the following description and indicated in the views of the drawings by the same reference characters.

The vehicle-body 1, rear axle 2, and wheels 3, fitted upon each end of the axle 2, are well-known parts of a wagon or like vehicle and are illustrated to demonstrate the relation of the brake and train of connections comprising the brake mechanism.

A band 4 is secured to the inner hub end of the vehicle-wheel 3 and is grooved in its peripheral surface to form a seat for the reception of the brake or friction strap 5. The outer end of the band 4 is made heavy, so as to allow for the annular seat provided to receive the brake-strap 5, and its inner end is notched, forming fingers 19, which enter the spaces between the inner ends of the spokes, whereby advantage is taken of the spokes as means to prevent the brake-band 4 from turning upon the hub when the brake is set. The inner half of the hub is reduced in diameter, as shown in Fig. 3, and the fingers 19 of the brake-band bound the inner walls of the spoke-socket and protect the edges thereof from breaking. Thus the fingers 19 serve the double function of securing the brake-band from rotating and protecting the spoke-sockets. The friction or brake strap 5 nearly or quite encircles the brake-band 4 and is fitted in the annular groove or seat thereof. A block 6 is firmly attached to one end of the friction or brake strap, and a triangular-shaped link 7 has pivotal connection at one end with the opposite end of the said strap 5 and with the block 6. The outer end of the link 7 is formed with a transverse opening 8, of square or angular outline, to receive the correspondingly-formed end 9 of a rod 10, extending transversely of the vehicle and mounted in hangers 11, bolted to the axle 2. By this means the link 7 has detachable connection with the rod 10 and when in position thereon turns therewith, whereby the brake is set or released, according to the direction of rocking the rod 10. The block 6 is of angular form and is connected to the extreme end of the strap 5, extending a suitable distance thereon, as shown in Fig. 4. The angle portion or arm of the block carries the link 7 and spaces the same away from the brake-band and hub, so as not to interfere with the working of the device. By this arrangement it will be observed that as the link 7 is turned the end of the strap carrying the block is wedged firmly against the brake-band, as will be understood.

When it is required to remove the vehicle-wheel for lubricating it or to place a washer upon the axle-arm to take up wear or for any desired purpose, the brake mechanism is no hindrance to such operation, because the link 7, with the friction-strap 5, will move with the vehicle-wheel because of the slidable connection had between said link and its supporting-rod 10.

A bracket 12 is pendent from the bottom of the vehicle-body and supports a shaft 13, to which is secured an arm 14, the latter being connected by means of a rod 15 and a corresponding arm 16, secured to the rod 10. The connecting-rod 15 is composed of alining sections which are adjustably connected by means of a turnbuckle 17, which has a swivel connection at one end with one of the sections and a screw-thread connection at its opposite end with the other section, whereby upon turning the connection 17 the sections or parts comprising the rod 15 are drawn together or separated, as required.

A foot-lever 18 is secured to the shaft 13 and projects through an opening in the bottom of the vehicle-body and is within convenient reach of the driver's foot, so as to be pressed upon when it is required to set the brake. The precise location of the foot-lever 18 is unimportant so long as it is readily accessible from the driver's seat, and the brake mechanism may be applied to one or both of the rear wheels, the parts being duplicated when both wheels are equipped with the brake devices.

Having thus described the invention, what is claimed, and desired to be secured by Letters Patent, is—

1. In a vehicle-brake, the combination of a brake-band firmly applied to a hub end of a vehicle-wheel, a friction or brake strap encircling the brake-band, a link having its end portions pivotally connected with the opposite ends of the friction-strap and mounting the latter upon the brake-band, a rod forming a support for the said block and having the latter detachably connected therewith, whereby the wheel carrying the brake-band, friction-strap and link may be removed from the axle without disturbing the relative position of the parts and means under the control of the driver for turning the said rod to apply the brake, substantially as set forth.

2. In a vehicle-brake, the combination with a hub reduced in diameter at its inner end, of a hub-band fitted flush on the reduced portion of the hub and having integral fingers extending between but having no connection with the spokes and partially bounding the walls of the spoke-sockets and being flush with the periphery of the enlarged portion of the hub, the outer end of the band being enlarged and provided with a groove in its periphery forming an annular seat, a brake or friction strap encircling the brake-band and fitted in the seat thereof, and means for drawing the ends of the strap together to apply the brake, substantially as set forth.

3. In a vehicle-brake, the combination of a friction or brake strap fitted into an annular seat or groove provided at the end portion of a vehicle-wheel, a link having its end portions pivotally connected with the ends of the friction-strap and formed with an angular opening, a rod having an end portion made angular to receive the aforesaid link, which latter has detachable connection therewith by a sliding movement, thereby admitting of the vehicle-wheel being removed from its axle-arm for any desired purpose, and a train of connections under the control of the driver for turning the rod and applying the brake, substantially as described.

4. In a vehicle-brake, the combination of a shaft, a foot-lever secured to the said shaft and within convenient reach of the driver's foot, an arm applied to the said shaft, a rod parallel with the rear axle of the vehicle and having an end portion made angular, an arm secured to the said rod, an adjustable connection between the front and rear arms, a brake-band applied to the inner end of the hub of a vehicle-wheel and having an annular seat, a brake or friction strap fitted in the said seat, and a link of approximately triangular shape having corresponding end portions pivotally connected with the terminals of the friction-strap and having an angular opening formed transversely of its opposite end to make detachable connection with the angular end of the aforesaid rod, substantially as and for the purpose set forth.

5. In a vehicle-brake, the combination of a brake-band carried by a hub, a friction or brake strap encircling the brake-band, and an angle-block secured at one end and upon the outer face of the brake-strap, with a link pivoted to the outer end of said block and to the other end of the strap whereby the ends of the strap are connected and the same is mounted upon the brake-band, a rod forming a support for said block and having the latter detachably connected therewith, whereby the wheel carrying the brake-band, friction-strap and link may be removed from the axle without disturbing the relative position of the parts, and means for turning the said rod to apply the brake, substantially as set forth.

In testimony that I claim the foregoing as my own I have hereto affixed my signature in the presence of two witnesses.

FRANK W. CHADWICK.

Witnesses:
 EDWARD JAHN,
 CHAS. A. RENNAN.